(12) United States Patent
Stornant

(10) Patent No.: US 7,036,458 B1
(45) Date of Patent: May 2, 2006

(54) PORTABLE ANIMAL CARRIER AND LITTER BOX SYSTEM

(76) Inventor: Kristine Stornant, 580 George St. South, Tarpon Springs, FL (US) 34688

( * ) Notice: Subject to any disclaimer, the term of this patent is extended or adjusted under 35 U.S.C. 154(b) by 0 days.

(21) Appl. No.: 10/347,646

(22) Filed: Jan. 21, 2003

(51) Int. Cl.
*A01K 31/07* (2006.01)

(52) U.S. Cl. .................. 119/496; 119/453; 119/458

(58) Field of Classification Search ............... 119/496, 119/452–454, 458, 475, 479, 497, 500, 101
See application file for complete search history.

(56) References Cited

U.S. PATENT DOCUMENTS

| | | | | |
|---|---|---|---|---|
| 4,572,107 A | * | 2/1986 | Clarizo | 119/463 |
| 4,852,520 A | * | 8/1989 | Goetz | 119/497 |
| 5,253,612 A | * | 10/1993 | Goetz | 119/496 |
| 5,357,900 A | * | 10/1994 | Ho | 119/479 |
| 5,471,950 A | * | 12/1995 | White | 119/497 |
| 5,503,107 A | * | 4/1996 | Satcher et al. | 119/496 |
| 5,988,110 A | * | 11/1999 | Peterson | 119/453 |
| 6,230,656 B1 | * | 5/2001 | Walach | 119/496 |
| 6,523,499 B1 | * | 2/2003 | Chrisco et al. | 119/496 |

* cited by examiner

*Primary Examiner*—Teri Pham Luu
*Assistant Examiner*—Kimberly S. Smith
(74) *Attorney, Agent, or Firm*—Edward P. Dutkiewicz

(57) ABSTRACT

A housing has a front wall and a door, a rear wall, a pair of side walls each with a window, a bottom wall with a bottom recess with a lower hinged door, a top wall with a top aperture with an upper hinged door with a plurality of ventilation apertures, a water bottle, and a food receptacle. The housing receives animal litter on the bottom wall. Wheels are coupled to the bottom wall. A removable transportation rod is snap coupled with pivoting capabilities.

3 Claims, 6 Drawing Sheets

PORTABLE ANIMAL CARRIER AND LITTER BOX SYSTEM

BACKGROUND OF THE INVENTION

1. Field of the Invention

The present invention relates to a portable animal carrier and litter box system and more particularly pertains to transporting and caring for an animal in an efficient and humane way.

2. Description of the Prior Art

The use of animal carriers and litter boxes of known designs and configurations is known in the prior art. More specifically, animal carriers and litter boxes of known designs and configurations previously devised and utilized for the purpose of caring for animals and transporting them through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,092,270 issued Mar. 3, 1992, to Simons et al. discloses a carrier cage for cats or other small animals. U.S. Pat. No. 5,113,793 issued May 19, 1992, to Leader discloses a mobile pet carrier. U.S. Pat. No. 5,134,974 issued Aug. 4, 1992, to Houser discloses a portable cat litter case. U.S. Pat. No. 5,785,000 issued Jul. 28, 1998, to Barbary discloses a kitty litter assembly. U.S. Pat. No. 5,361,725 issued Nov. 8, 1994, to Baillie et al. discloses a litter containment apparatus for kittens and cats. U.S. Pat. No. 5,471,950 issued Dec. 5, 1995, to White discloses an animal carrier with detachable litter box. U.S. Pat. No. 5,678,509 issued Oct. 21, 1997, to Dillon discloses an all-in-one litter box, sleeping area, and food and water bowl system useable as a pet carrier. U.S. Pat. No. 6,298,808 issued Oct. 9, 2001, to Crafton et al. discloses an animal privacy system. U.S. Pat. No. 6,371,048 issued Apr. 16, 2002, to Smith discloses a cat litter box. U.S. Pat. No. 2,821,165 issued Jan. 28, 1958, to Wright discloses a mobile pet home. U.S. Pat. No. 4,852,520 issued Aug. 1, 1989 to Goetz discloses a portable pet carrier. U.S. Pat. No. 5,701,843 issued Dec. 30, 1997, to Lazides discloses a pet mobile. U.S. Pat. No. 6,021,740 issued Feb. 8, 2000, to Martz discloses a wheeled animal carrier. Finally, U.S. Pat. No. 5,979,364 issued Nov. 9, 1999, to Ricketts discloses a modular shipping crate system.

While these devices fulfill their respective, particular objectives and requirements, the aforementioned patents do not describe a portable animal carrier and litter box system that allows transporting and caring for an animal in an efficient and humane way.

In this respect, the portable animal carrier and litter box system according to the present invention substantially departs from the conventional concepts and designs of the prior art, and in doing so provides an apparatus primarily developed for the purpose of transporting and caring for an animal in an efficient and humane way.

Therefore, it can be appreciated that there exists a continuing need for a new and improved portable animal carrier and litter box system which can be used for transporting and caring for an animal in an efficient and humane way. In this regard, the present invention substantially fulfills this need.

SUMMARY OF THE INVENTION

In view of the foregoing disadvantages inherent in the known types of animal carriers and litter boxes of known designs and configurations now present in the prior art, the present invention provides an improved portable animal carrier and litter box system. As such, the general purpose of the present invention, which will be described subsequently in greater detail, is to provide a new and improved portable animal carrier and litter box system and method which has all the advantages of the prior art and none of the disadvantages.

To attain this, the present invention essentially comprises a first housing. The first housing is in a generally rectilinear configuration. The first housing has a front wall. The front wall has a front handle, an identification plate with indicia and a door. The door is a linearly sliding plate retained by a peripheral lip and held in place by gravity. It may lock into place. The first housing also has a rear wall with a rear handle. The first housing also has a pair of side walls. Each side wall has a rectangular light transparent window. The first housing has a bottom wall. The bottom wall has a bottom recess. A lower hinged door is provided in the bottom recess and has a pivot point adjacent to the rear wall. The first housing also has a top wall. The top wall has a plurality of hemi-cylindrical recesses. The top wall has a top aperture. An upper hinged door in the top aperture is provided with a pivot point adjacent to the rear wall. The upper hinged door has a plurality of ventilation apertures. Ventilation may also be included in other walls. The first housing also has a dividing wall running perpendicular to the side walls. The dividing wall has a rectangular aperture. A flap door covers the rectangular aperture. The dividing wall defines a first chamber and a second chamber.

The first chamber is adjacent to the rear wall. The first chamber is adapted to receive animal litter on the bottom wall within a litter box region. The litter box region is defined by the dividing wall, the rear wall and a portion of the side walls. The animal litter is adapted to be removed upon opening of the lower hinged door.

The second chamber is adjacent to the front wall. The second chamber has a side wall mounted water bottle with a leak-free nozzle. The second chamber also has a wall mounted food receptacle.

Next provided is a plurality of wheels. The wheels are coupled to the bottom wall of the first housing. The wheels are provided for the easy transport of the first housing. The wheels are adapted to be received in the hemi-cylindrical recess of the top wall of the first housing when multiple housing devices are stacked.

Next a removable transportation rod is provided. The transportation rod has a handle fixed to a pair of coupling beams. The coupling beams are adapted to have a removable snap coupling with pivoting capabilities. The transportation rod is adapted to facilitate the moving of the first housing and is removable for storage and aesthetic purposes.

Lastly, a second housing is adapted to receive the first housing and be a receptacle for the disposed animal litter. The second housing has a hollow generally rectangular configuration. The second housing has a ramp. The second housing also has a riding path with an aperture in the middle thereof. A trash receptacle is provided in the second housing. A door retainer is designed to allow the lower hinged door to drop to an optimal position for the removal of animal litter.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable animal carrier and litter box system which has all of the advantages of the prior art animal carriers and litter boxes of known designs and configurations and none of the disadvantages.

It is another object of the present invention to provide a new and improved portable animal carrier and litter box system which may be easily and efficiently manufactured and marketed.

It is further an object of the present invention to provide a new and improved portable animal carrier and litter box system which is of durable and reliable constructions.

An even further object of the present invention is to provide a new and improved portable animal carrier and litter box system which is susceptible of a low cost of manufacture with regard to both materials and labor, and which accordingly is then susceptible of low prices of sale to the consuming public, thereby making such portable animal carrier and litter box system economically available to the buying public.

Even still another object of the present invention is to provide a portable animal carrier and litter box system for transporting and caring for an animal in an efficient and humane way.

Lastly, it is an object of the present invention to provide a new and improved portable animal carrier and litter box wherein a housing has a front wall and a door, a rear wall, a pair of side walls each with a window, a bottom wall with a bottom recess with a lower hinged door, a top wall with a top aperture with an upper hinged door with a plurality of ventilation apertures, a water bottle, and a food receptacle. The housing receives animal litter on the bottom wall. Wheels are coupled to the bottom wall. A removable transportation rod is snap coupled with pivoting capabilities.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
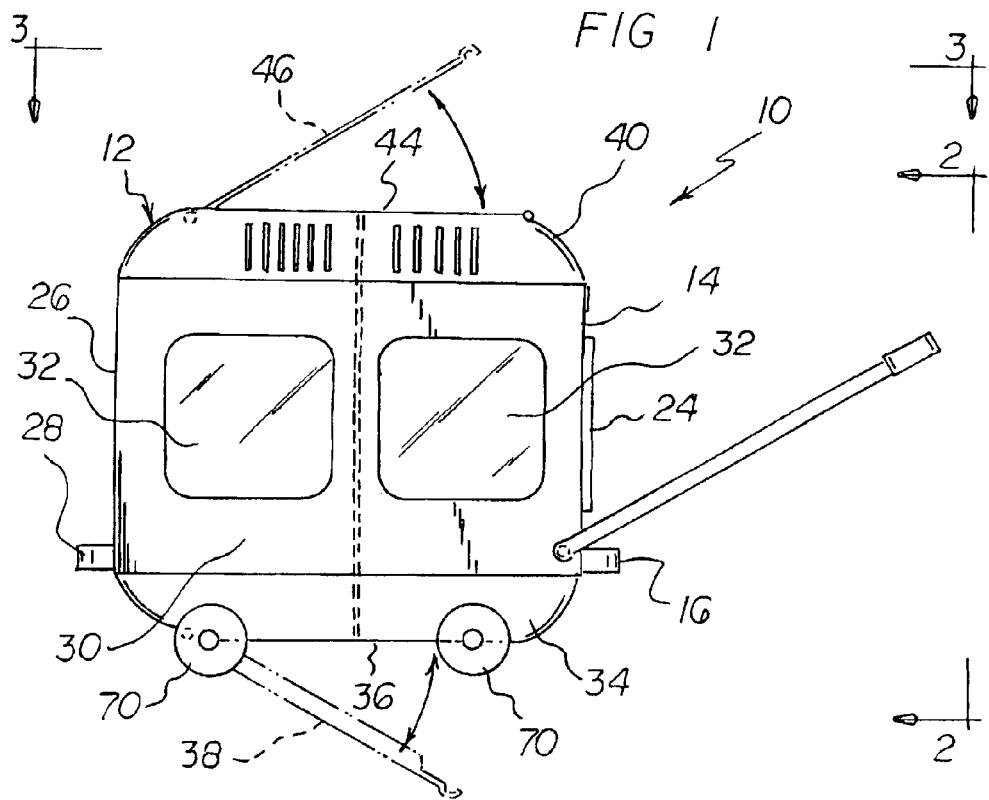
FIG. 1 is a side elevational view of a portable animal carrier and litter box system constructed in accordance with the principles of the present invention.
Figure 2:
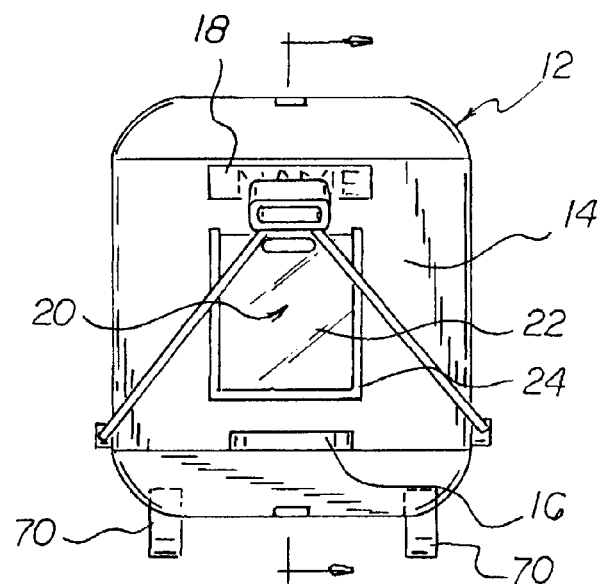
FIG. 2 is a front elevational view taken along line 2—2 of FIG. 1.
Figure 3:
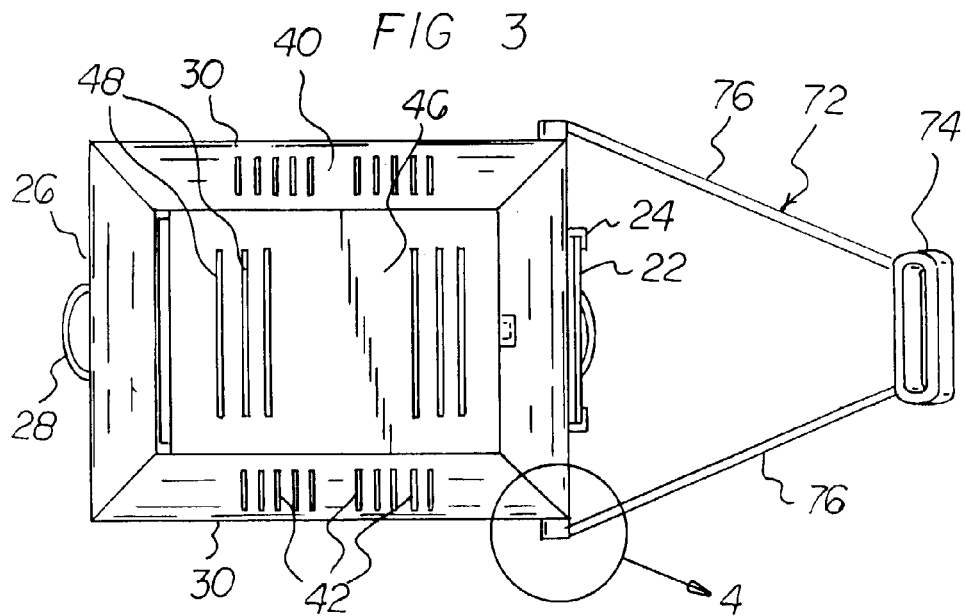
FIG. 3 is a plan view taken along line 3—3 of FIG. 1.
Figure 4:
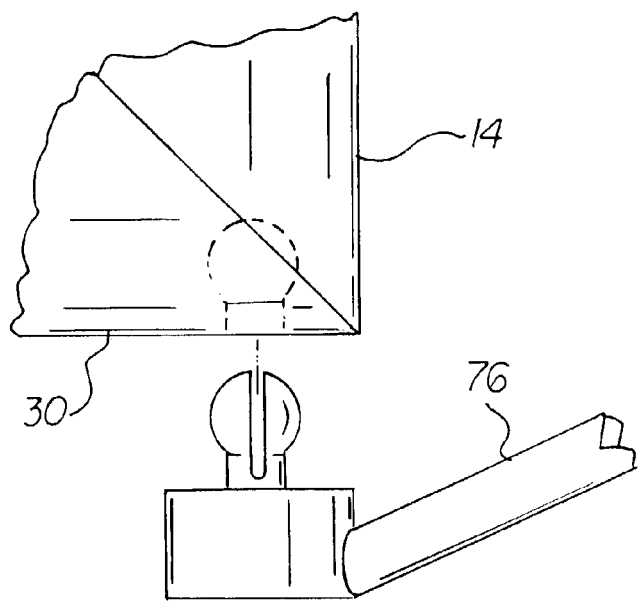
FIG. 4 is an enlarged exploded top view taken at circle 4 of FIG. 3.
Figure 5:
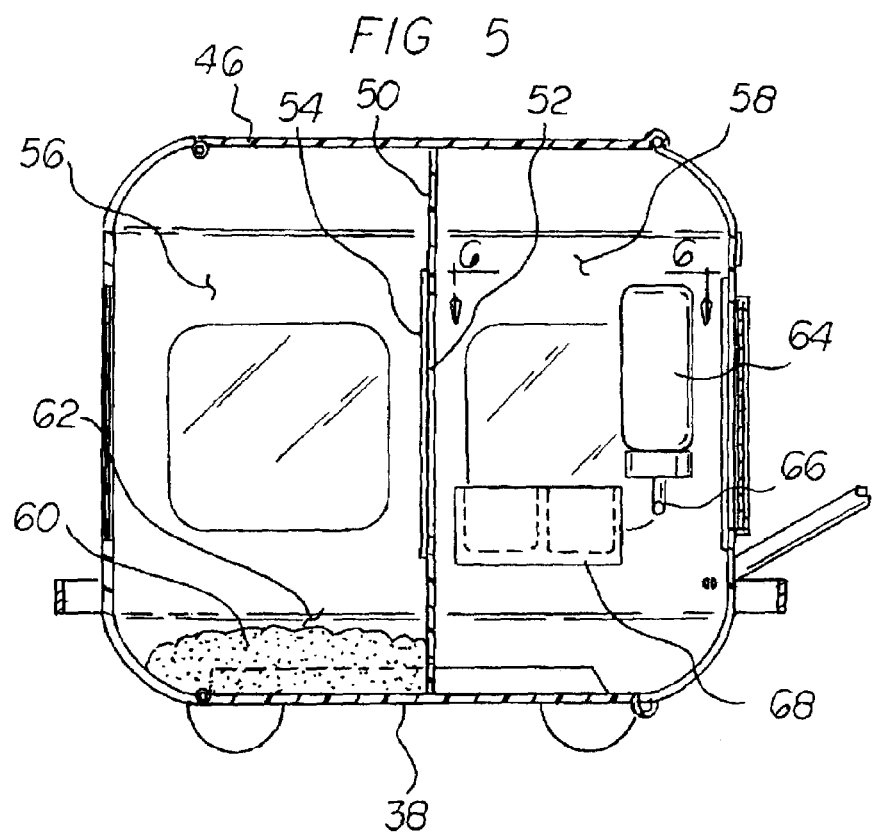
FIG. 5 is a cross sectional view taken along line 5—5 of FIG. 2.
Figure 6:
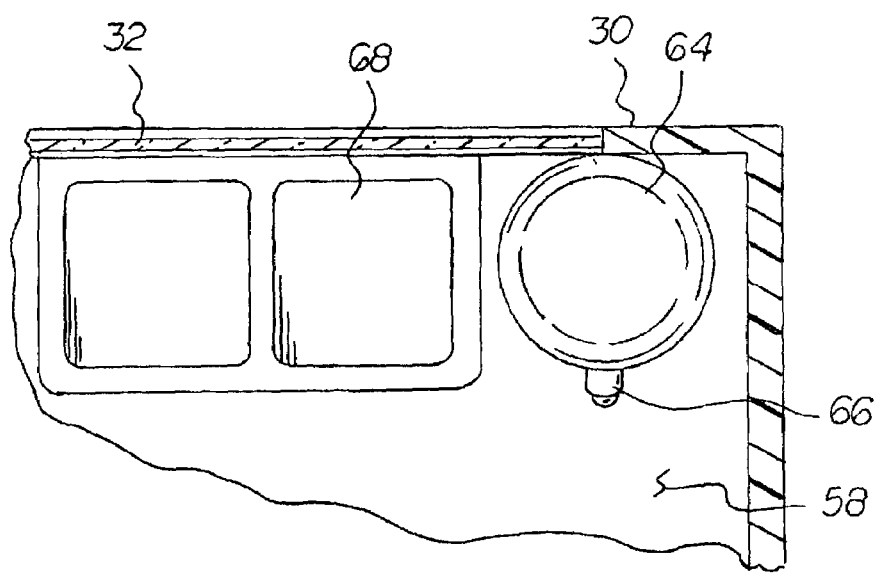
FIG. 6 is a cross sectional view taken along line 6—6 of FIG. 5.
Figure 7:
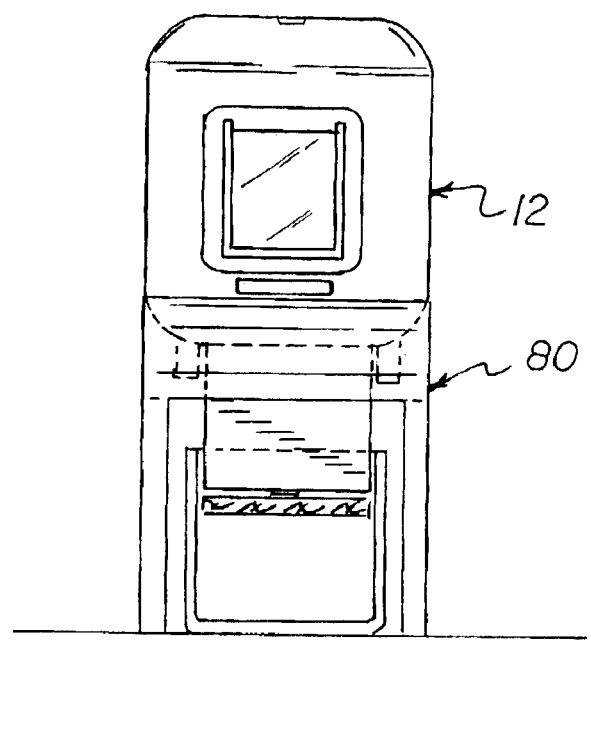
FIG. 7 is a rear elevational view of an alternate embodiment of the invention.
Figure 8:
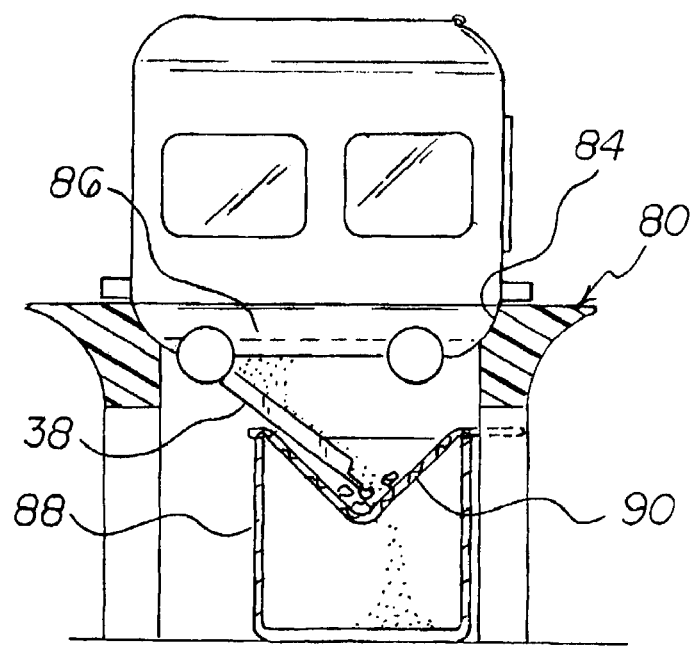
FIG. 8 is a side elevational view taken along line 8—8 of FIG. 7.
Figure 9:
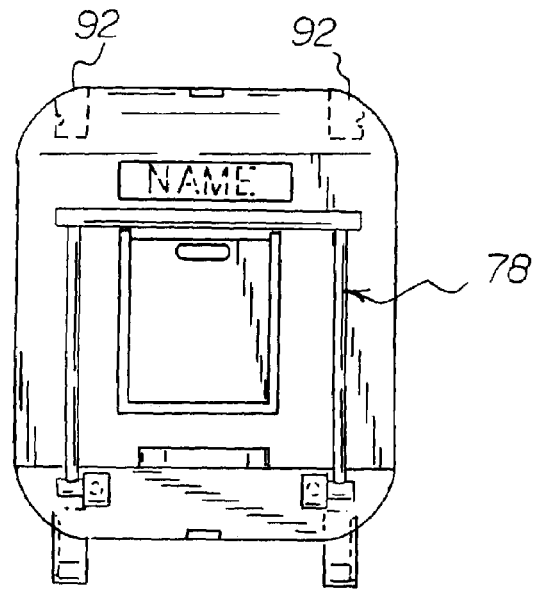
FIG. 9 is a front elevational view of the alternate embodiment.
Figure 10:
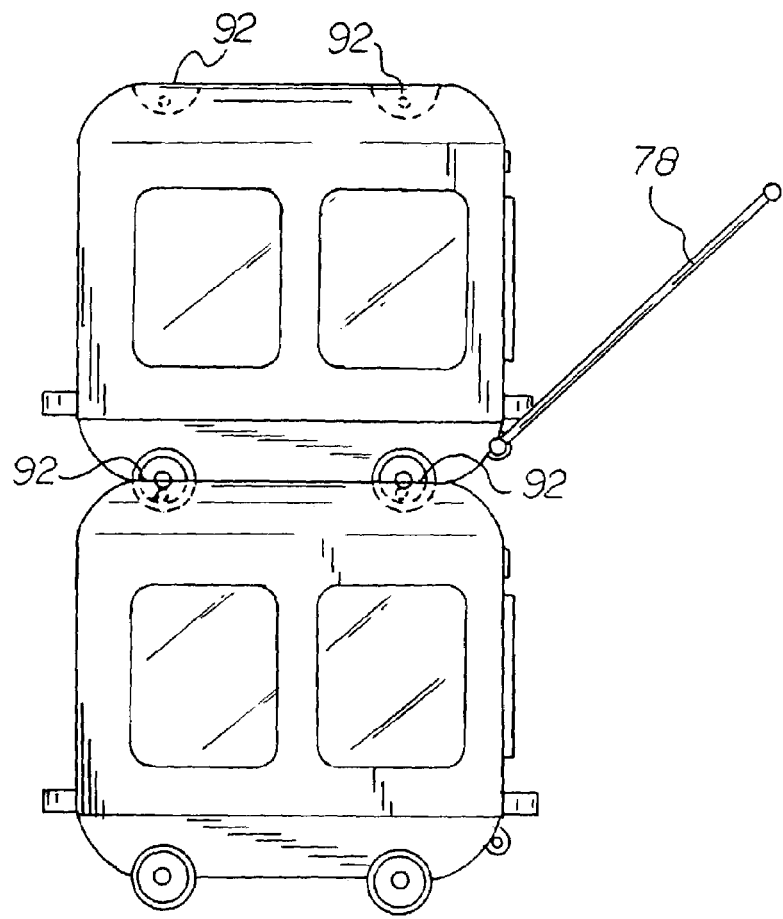
FIG. 10 is a side elevational view of a second alternate embodiment of the invention.
Figure 11:
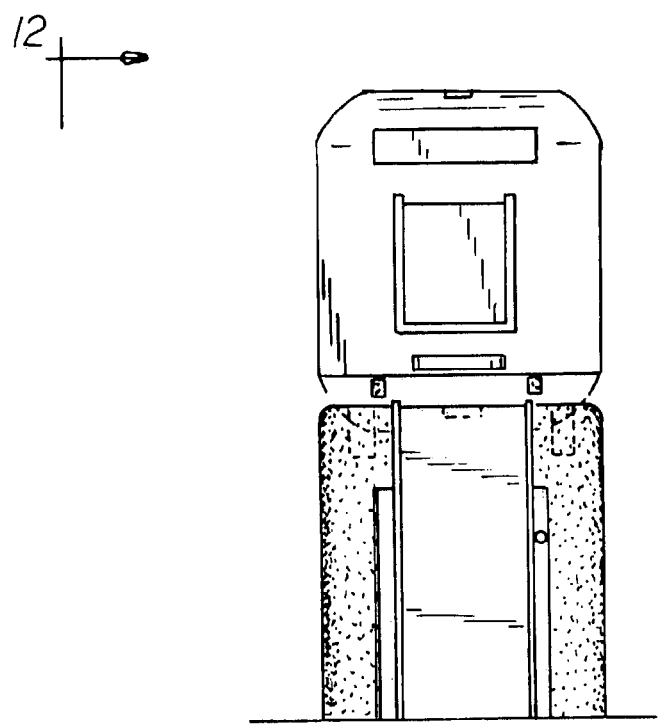
FIG. 11 is a rear elevational view of a third alternate embodiment of the invention.
Figure 12:
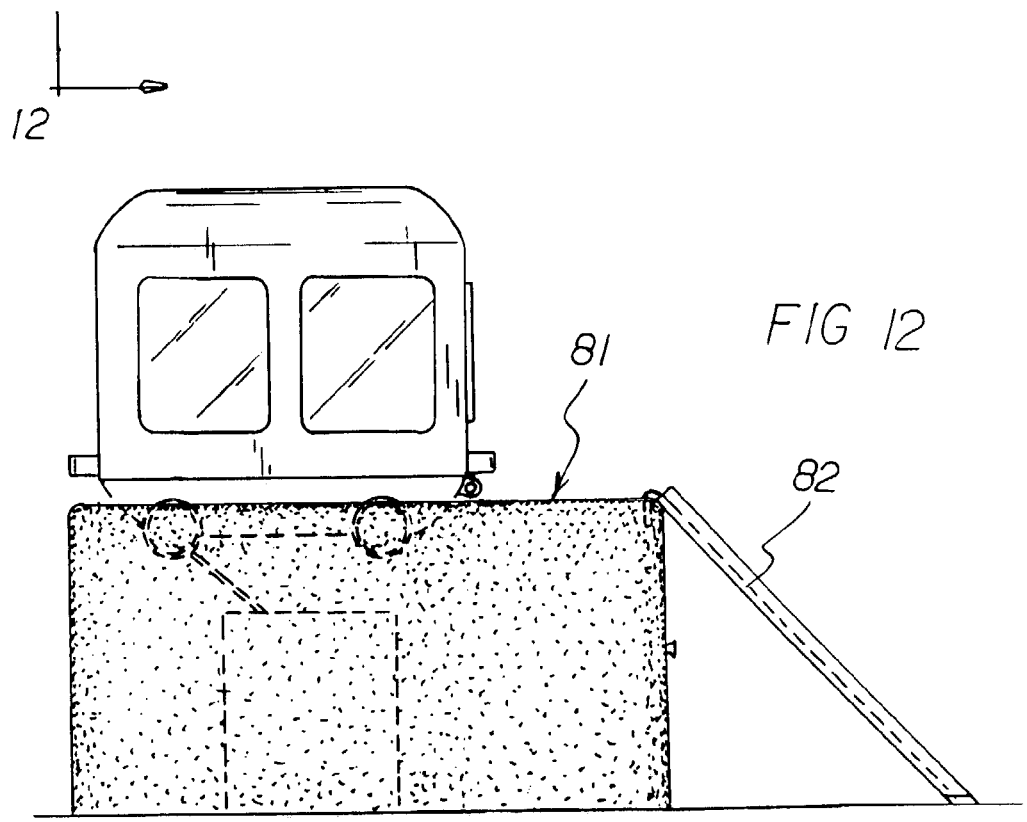
FIG. 12 is a side elevational view taken along line 12—12 of FIG. 11.

With reference now to the drawings, and in particular to FIG. 1 thereof, the preferred embodiment of the new and improved portable animal carrier and litter box system embodying the principles and concepts of the present invention and generally designated by the reference numeral 10 will be described.

The present invention, the portable animal carrier and litter box system 10 is comprised of a plurality of components. Such components in their broadest context include a housing, a plurality of wheels, and a removable transportation rod. Such components are individually configured and correlated with respect to each other so as to attain the desired objective. A portable animal carrier and litter box system provides for transporting and caring for an animal in an efficient and humane way.

First provided is a first housing 12. The first housing is in a generally rectilinear configuration. The first housing has a front wall 14. The front wall has a front handle 16, an identification plate 18 with indicia and a door 20. The door is a linearly sliding plate 22, preferably of a transparent plastic, retained by a peripheral lip 24 and held in place by gravity. The first housing also has a rear wall 26 with a rear handle 28. The first housing also has a pair of side walls 30. Each side wall has a rectangular light transparent window 32. The first housing has a bottom wall 34. The bottom wall has a bottom recess 36. A lower hinged door 38 is provided in the bottom recess and has a pivot point adjacent to the rear wall. Such door has side plates extending upwardly to preclude the litter from falling off of the sides of the door during disposing of the litter. The first housing also has a top wall 40. The top wall has a plurality of hemi-cylindrical recesses 92. The top wall has a top aperture 44. An upper hinged door 46 is provided in the top aperture with a pivot point adjacent to the rear wall. The upper hinged door has a plurality of ventilation apertures 48. The first housing also has a dividing wall 50 running perpendicular to the side walls. The dividing wall has a rectangular aperture 52. A flap door 54 covers the rectangular aperture. The dividing wall defines a first chamber 56 and a second chamber 58.

The first chamber 56 is adjacent to the rear wall. The first chamber is adapted to receive animal litter 60 on the bottom wall within a litter box region 62. The litter box region is defined by the dividing wall, the rear wall and a portion of the side walls. The animal litter is adapted to be removed upon opening of the lower hinged door.

The second chamber 58 is adjacent to the front wall. The second chamber has a side wall mounted water bottle 64 with a leak-free nozzle 66. The second chamber also has a wall mounted food receptacle 68.

Next provided is a plurality of wheels 70. The wheels are coupled to the bottom wall of the first housing. The wheels are provided for the easy transport of the first housing. The wheels are adapted to be received in the hemi-cylindrical recess of the top wall of the first housing when multiple housing devices are stacked.

Next a removable transportation rod 72 is provided. The transportation rod has a handle 74 fixed to a pair of coupling beams 76. The coupling beams are adapted to have a removable snap coupling with pivoting capabilities. The transportation rod is adapted to facilitate the moving of the first housing and is removable for storage and aesthetic purposes.

In an alternative configuration, the transportation rod 78 is configured with right angles between each of the members, forming a generally rectangular configuration.

Lastly, a second housing 80, 81 is adapted to receive the first housing and be a receptacle for the disposed animal litter. The second housing has a hollow generally rectangular configuration. The second housing has a ramp 82. The second housing also has a riding path 84 with an aperture 86 in the middle thereof. A trash receptacle 88 is provided in the second housing. A door retainer and filter 90 is designed to allow the lower hinged door to drop to an optimal position for the removal of animal litter.

In an alternative configuration there may be a plurality of the housings being stack-able, with each having a generally rectangular shaped transportation rod thereto coupled, and a plurality of recesses, 92, to receive wheels from the housing thereabove. The present invention relates to all animals, mainly but not limited to cats, in need of a portable and/or stationary litter box/den with or without an enclosure. The invention provides an easier way to clean and discard cat litter. The invention provides a neater looking appearance and may be custom made with the cat's/family's name, etc. A rubber flap keeps litter in the box preventing it from being scattered on the floor. The cat box/den can be used when traveling since it includes cat litter, food, water, etc. The present invention is versatile. The divider wall, separator, enables the den to be both a litter box and a den with a place for the cat or small animal to lay and a litter box all in one.

The present invention may be made in different sizes for smaller or larger animals. The four wheels are similar to luggage wheels on the bottom for easy transport. Three handles, two lips on each end and one longer handle that slides out like that for apiece of luggage, are provided for easy lifting and toting. The flap door in the front provides for easy animal entry and exiting and keeps contents from coming out of the container for less mess on the floor. A special piece, metal or plastic, slides down in front of the front flap door and locks into place to safely retain the animal inside if and when the animal is being transported. The bottom floor has two hinges in the back and a latch in the front that can be released to drop down into the trash can for easy removal of waste, etc. The top has two vents for air access, one near the front and one near the back. Air vents may also be placed on the sides, front and back. The top also has two hinges and a latch so that components, litter, food, water, animal, etc., can be placed inside easily. Inside there is a divider wall, or separator, to close off half of the box to make it a half litter box and half den. The separator slides down into grooves. The separator has a flap door in the middle of it so that the den and litter area can be closed off and so no litter will be thrown into the den area. Viewing windows are provided in some embodiments.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable animal carrier and litter box system comprising:

a first housing having a front wall and a door, a rear wall, a pair of side walls each with a window, a bottom wall with a bottom recess having a lower hinged door, a top wall with a top aperture having a door having a plurality of ventilation apertures, a dividing wall running perpendicular to the side walls with a rectangular aperture and having a flap door covering the rectangular aperture, the dividing wall defining a first chamber, and a second chamber, the first chamber being adjacent to the rear wall and adapted to receive animal litter on the bottom wall within a litter box region defined by the dividing wall, the rear wall and a portion of the side walls, the animal litter being adapted to be removed upon opening of a lower hinged door;

a plurality of wheels being coupled to the bottom wall the first housing;

a removable transportation rod being removably snap coupling with pivoting capabilities, and a second housing being adapted to receive the first housing and be a receptacle for the disposed animal litter.

2. The system as set forth in claim 1 wherein the second chamber is adjacent to the front wall and has a side wall mounted water bottle with a leak-free nozzle and a wall mounted food receptacle.

3. The system as set forth in claim 1 wherein the removable transportation rod has a configuration which is formed by right angles of the intersecting members of the rod thereby having a generally rectangular-like configuration when coupled in place.

* * * * *